Aug. 29, 1950 C. N. NILSON 2,520,327
CYLINDER MOLD PAPERMAKING MACHINE
Filed May 17, 1947
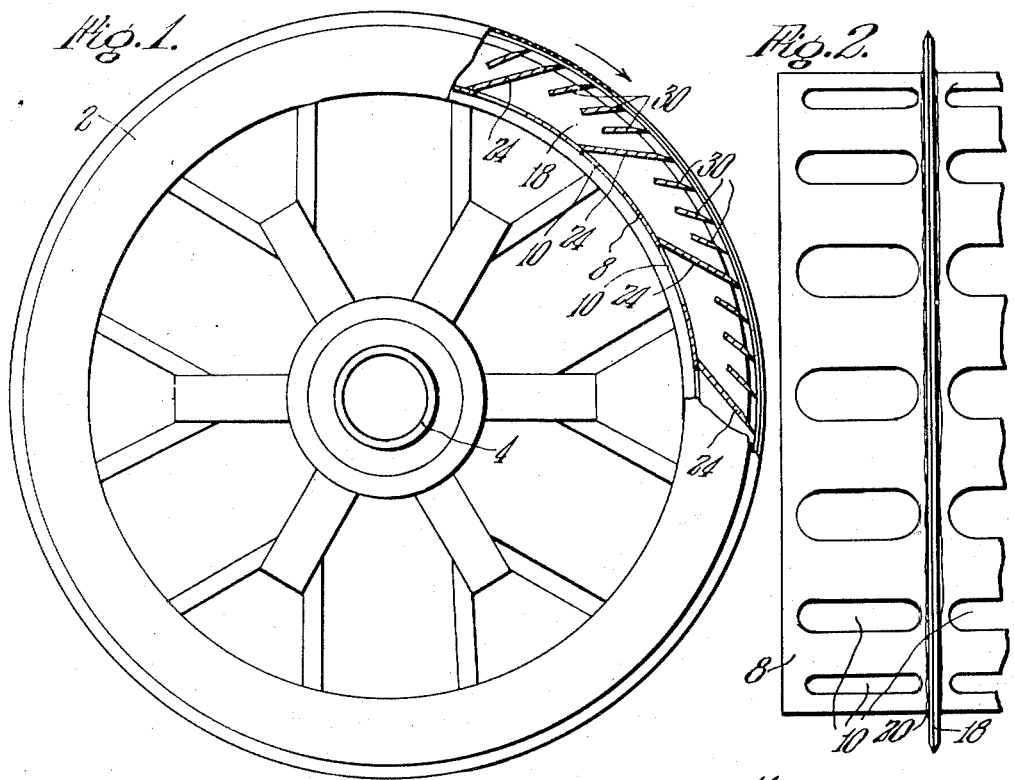
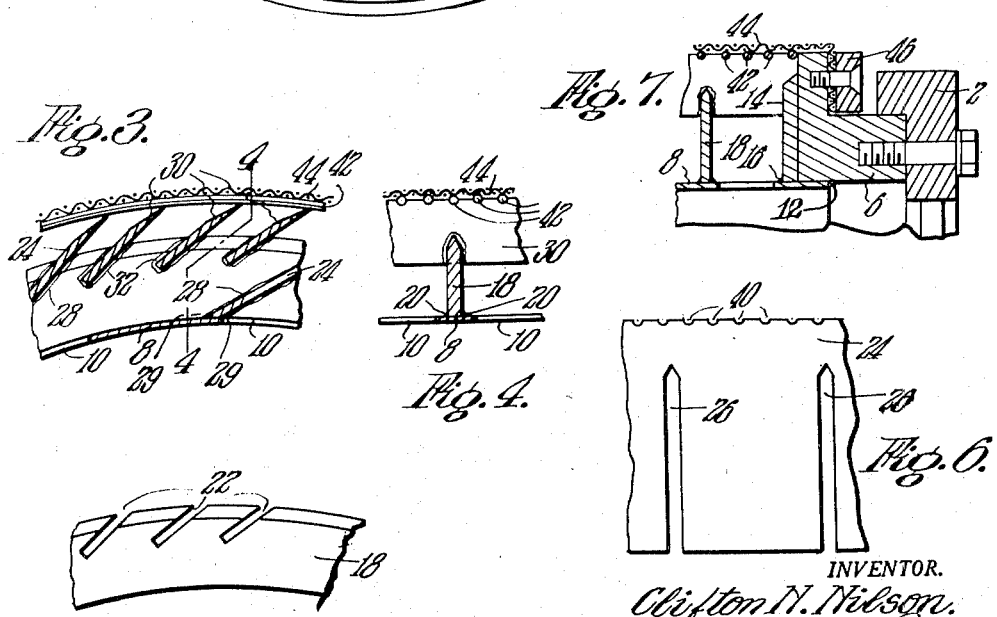
INVENTOR.
Clifton N. Nilson.
BY Walter C Ross
Attorney.

Patented Aug. 29, 1950

2,520,327

UNITED STATES PATENT OFFICE 2,520,327

CYLINDER MOLD PAPERMAKING MACHINE

Clifton N. Nilson, Springfield, Mass., assignor to Cheney Bigelow Wire Works, Springfield, Mass., a corporation of Massachusetts Application May 17, 1947, Serial No. 748,773

2 Claims. (Cl. 92—43)

This invention relates to paper making apparatus and is directed more particularly to cylinders or cylinder molds for cylinder paper making machines.

The principal objects of the invention are the provision of a cylinder mold which is strong in construction and efficient in operation and is accomplished by a novel combination and arrangement of parts as will hereinafter appear.

The speed of a cylinder paper making machine is often limited by the speed at which the cylinder mold may be rotated. That is, at some certain critical speed of rotation prior art cylinder molds tend to throw water and the mat of fibers thereon outwardly whereby the machine must be operated at less than that speed.

According to the novel features of this invention, a cylinder mold construction is provided which overcomes the objections of prior art molds in that the novel mold tends to cause water to pass inwardly of the mold and the mat to adhere thereto wherefor greater operating speeds and increased production may be attained.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is an end elevational view of a cylinder mold embodying the novel features of the invention with parts shown in section for clearness;

Fig. 2 is an elevational view of an end portion of the inner cylinder of the mold shown in Fig. 1;

Fig. 3 is a partial transverse sectional elevational view through the mold at the periphery thereof to show features of construction;

Fig. 4 is a sectional elevational view on the line 4—4 of Fig. 3;

Fig. 5 is a partial elevational view of one of the rings of the cylinder mold;

Fig. 6 is a partial elevational view of one of the longitudinal beam members of the cylinder mold; and Fig. 7 is a partial longitudinal sectional elevational view at one end of the cylinder mold showing details of construction.

Referring now to the drawings more in detail, the invention will be fully described.

The cylinder mold of the invention includes, in a general way, a supporting structure having a foraminous surface thereof. End heads 2 in which a shaft 4 is fixed has its periphery secured to annular end rings 6 as shown in Fig. 7. There are heads such as 2 at opposite ends of the mold and they may be of any well known form. The members 2 and 6 constitute end head structures.

An inner cylinder or shell 8 is provided which has a relatively thin wall and it is formed to have a plurality of openings such as 10 therethrough. In the preferred form of the invention, the openings are arranged in circumferentially spaced relation. That is, there are circumferentially disposed and longitudinally spaced rows of openings. The openings extend longitudinally of the cylinder and the rows of openings are spaced longitudinally thereof. The openings may be of any desired form.

The cylinder 8 is secured to the end rings 6 as by welding as at 12, see Fig. 7. There may be a ring 14 welded at 16 to the cylinder and secured to the end rings as shown in Fig. 7. Reinforcing rings 18 are provided which encircle and are secured to the cylinder 8 as by welding at 20. These rings are preferably disposed on the cylinder between the longitudinally spaced rows of openings 10 therein.

The rings 18 are provided with circumferentially spaced inwardly extending slots 22. These slots 22 are generally radially disposed but are angularly located as shown in Fig. 5. They incline inwardly from the periphery of the mold and away or rearwardly of the direction of rotation of the mold indicated by the arrow in Fig. 1.

A plurality of longitudinally extending primary beams 24 are provided which are provided with slots such as 26, see Fig. 6. The slots 26 receive the inner parts of the rings and the slots 22 of the rings receive the outermost parts of the beams 24. Said beams 24 are secured to the rings 18 in some suitable manner such as welding at 28 and to the cylinder as by welding 29. Intermediate or secondary beams 30 are provided which are received in the slots 22 of the rings and are secured thereto as by welding at 32. The outer portions of the beams may be tapering as shown in Fig. 3.

It will be observed that the cylinder 8 being secured to the end rings 6 as it is and the rings 18 secured to the cylinder with the primary and secondary longitudinally extending beams secured as they are a strong, rigid construction for supporting the foraminous surface of the cylinder mold is provided.

In the form of the invention shown, the primary and secondary beams 24 and 30 are provided with longitudinally spaced seat or grooves such as 40 of the beams 24 in Fig. 6. The seats receive circumferentially arranged rods 42 and on this the roll covering 44 is applied. The covering may be of any desired woven wire cloth or the like and may be secured to the rods or about the rods in any desired and well known manner. The ends of the cover as shown in Fig. 4 are secured to the end rings 6 by annular rings 46 secured to rings 6 as shown in Fig. 7.

The construction is such as to provide a strong, rigid cylinder mold with the parts supporting the foraminous surface providing the desired and necessary space for water to pass through the foraminous surfaces into and through the cylinder mold. In operation the cylinder mold will be rotated in the direction of the arrow shown in Fig. 1 and in so rotating the action is such as to tend to cause water to pass readily inwardly of the cylinder mold as distinguished from prior art constructions where at certain critical speeds there is a tendency for the fiber mat on the foraminous surface to be thrown outwardly. By reason of the novel construction, the speed of rotation of the mold and the production of a paper machine is not limited by the construction of the cylinder mold as with prior art molds.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A cylinder mold comprising in combination, opposite end head structures, an inner hollow cylinder secured at opposite ends to said head structures, beam supporting annular rings around and extending radially outwardly from said inner cylinder and secured thereto in spaced relation longitudinally thereof, longitudinal primary and secondary beams extending longitudinally of the inner cylinder and secured to said rings and spaced circumferentially of the cylinder, a plurality of said secondary beams being disposed between adjacent primary beams and inner longitudinal edges of said secondary beams being spaced outwardly from said inner cylinder and corresponding inner edges of said primary beams being secured to the periphery of said cylinder, the transverse width of said primary and secondary beams being disposed generally radially of the mold and inclining inwardly and rearwardly relative to the direction of rotation of the mold, said inner cylinder being provided with circumferentially and longitudinally spaced openings therethrough, and a foraminous covering structure around and supported by outer longitudinal edges of said beams.

2. A cylinder mold comprising in combination, opposite end head structures, an inner hollow cylinder secured at opposite ends to said head structures, beam supporting annular rings around and extending radially outwardly from said cylinder and secured thereto in spaced relation longitudinally thereof, longitudinal primary and secondary beams extending longitudinally of the inner cylinder secured to said rings and spaced circumferentially of said cylinder, a plurality of said secondary beams being disposed between adjacent primary beams and inner longitudinal edges of said secondary beams being spaced outwardly from said inner cylinder and corresponding inner edges of said primary beams being secured to the periphery of said cylinder, the transverse width of said primary and secondary beams being disposed generally radially of the mold and inclining inwardly and rearwardly relative to the direction of rotation of said mold, said inner cylinder being provided with circumferentially and longitudinally spaced openings therethrough, and a foraminous covering structure around and supported by outer longitudinal edges of said beams, and outer longitudinal edge portions of said beams being tapered.

CLIFTON N. NILSON.

REFERENCES CITED

The following references are of record in the file of this patent:

UNITED STATES PATENTS

| Number | Name | Date |
| --- | --- | --- |
| 581,732 | Keeney | May 4, 1897 |
| 811,660 | Parker | Feb. 6, 1906 |
| 902,505 | Parker | Oct. 27, 1908 |
| 1,387,954 | Tidmarsh | Aug. 16, 1921 |
| 1,589,119 | Crandell | June 15, 1926 |
| 1,816,132 | Strindlund | July 28, 1931 |
| 1,861,381 | Crocker | May 31, 1932 |
| 1,911,310 | Ellis | May 30, 1933 |
| 1,937,426 | Formaini | Nov. 28, 1933 |
| 2,509,296 | Goldsmith | May 30, 1950 |

FOREIGN PATENTS

| Number | Country | Date |
| --- | --- | --- |
| 640,310 | Germany | Dec. 30, 1936 |